United States Patent
Huf et al.

(10) Patent No.: US 11,059,400 B2
(45) Date of Patent: Jul. 13, 2021

(54) VEHICLE SEAT CONSOLE

(71) Applicant: Bayerische Motoren Werke Aktiengesellschaft, Munich (DE)

(72) Inventors: Andreas Huf, Neusaess (DE); Robert Martin, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 25 days.

(21) Appl. No.: 16/528,947

(22) Filed: Aug. 1, 2019

(65) Prior Publication Data

US 2019/0351794 A1    Nov. 21, 2019

Related U.S. Application Data

(63) Continuation of application No. PCT/EP2018/054527, filed on Feb. 23, 2018.

(30) Foreign Application Priority Data

Feb. 27, 2017    (DE) .................... 10 2017 203 177.8

(51) Int. Cl.
    *B60N 2/42*    (2006.01)
    *B60N 2/02*    (2006.01)
    (Continued)

(52) U.S. Cl.
    CPC ............ *B60N 2/43* (2013.01); *B60N 2/0232* (2013.01); *B60N 2/075* (2013.01); *B60N 2/42745* (2013.01); *B60N 2002/0236* (2013.01)

(58) Field of Classification Search
    CPC ...... B60N 2/0232; B60N 2/067; B60N 2/075; B60N 2/4221; B60N 2/4228;
    (Continued)

(56) References Cited

U.S. PATENT DOCUMENTS

| 1,964,405 A | * | 6/1934 | Nenne | ................. B60N 2/0715 |
|---|---|---|---|---|
| | | | | 248/429 |
| 2,240,143 A | * | 4/1941 | Lustig | ................... B60N 2/071 |
| | | | | 248/394 |

(Continued)

FOREIGN PATENT DOCUMENTS

| CN | 1171336 A | 1/1998 |
|---|---|---|
| CN | 202829186 U | 3/2013 |

(Continued)

OTHER PUBLICATIONS

International Search Report (PCT/ISA/210) issued in PCT Application No. PCT/EP2018/054527 dated May 29, 2018 with English translation (four (4) pages).

(Continued)

*Primary Examiner* — James M Ference
(74) *Attorney, Agent, or Firm* — Crowell & Moring LLP

(57) ABSTRACT

A vehicle seat console has at least one vehicle-mounted guiding element, at least one seat-mounted guiding element that runs parallel to the vehicle-mounted guiding element, and a longitudinal adjustment mechanism on which a driving device acts via a transmission mechanism and which is designed to cause a relative adjustment between the vehicle-mounted guiding element and the seat-mounted guiding element. The vehicle seat console is characterized in that the longitudinal adjustment mechanism and/or the transmission mechanism is/are equipped with at least one energy absorption device which is configured to dampen abrupt relative movements between the vehicle-mounted guiding element and the seat-mounted guiding element.

9 Claims, 1 Drawing Sheet

(51) Int. Cl.
*B60N 2/075* (2006.01)
*B60N 2/427* (2006.01)

(58) Field of Classification Search
CPC ............ B60N 2/42709; B60N 2/42736; B60N 2/42745; B60N 2/43; B60N 2002/0236
See application file for complete search history.

(56) References Cited

U.S. PATENT DOCUMENTS

| | | | | | |
|---|---|---|---|---|---|
| 2,346,895 | A | * | 4/1944 | Bergman | B64D 11/0696 297/216.18 |
| 2,665,740 | A | * | 1/1954 | Rappl | B60N 2/0232 248/430 |
| 3,189,313 | A | * | 6/1965 | Burns | B64D 9/003 248/429 |
| 3,269,774 | A | * | 8/1966 | Friedhelm | B60N 2/42736 297/216.18 |
| 3,313,512 | A | * | 4/1967 | Colautti | B60N 2/0232 248/424 |
| 3,430,516 | A | * | 3/1969 | Pickles | B60N 2/0232 74/665 F |
| 3,437,302 | A | * | 4/1969 | Homier | B60N 2/0232 248/394 |
| 3,552,795 | A | * | 1/1971 | Perkins et al. | B60N 2/0745 297/216.18 |
| 3,578,376 | A | * | 5/1971 | Hasegawa | B60N 2/07 296/68.1 |
| 3,582,033 | A | * | 6/1971 | LaFleche | B60N 2/0843 248/430 |
| 3,603,638 | A | * | 9/1971 | McGregor | B64D 11/06 297/216.2 |
| 3,730,586 | A | * | 5/1973 | Eggert, Jr. | B60N 2/42709 297/216.18 |
| 3,806,190 | A | * | 4/1974 | Winslow | B60N 2/42736 297/216.18 |
| 3,832,002 | A | * | 8/1974 | Eggert, Jr. | B60R 22/26 297/216.18 |
| 3,853,298 | A | * | 12/1974 | Libkie | B60N 2/071 248/429 |
| 3,858,934 | A | * | 1/1975 | Eggert, Jr. | B60N 2/0747 297/216.18 |
| 4,232,895 | A | * | 11/1980 | Yoshio | B60N 2/4221 296/35.2 |
| 4,355,778 | A | * | 10/1982 | Hess | B60N 2/07 248/429 |
| 4,364,536 | A | * | 12/1982 | Kluting | B60N 2/0232 248/393 |
| 4,448,381 | A | * | 5/1984 | Anspaugh | B60N 2/0296 248/394 |
| 5,445,354 | A | * | 8/1995 | Gauger | B60N 2/0232 248/429 |
| 5,626,203 | A | * | 5/1997 | Habib | B60N 2/0276 180/274 |
| 5,746,409 | A | | 5/1998 | Rees | |
| 5,746,467 | A | * | 5/1998 | Jesadanont | B60N 2/4221 296/68.1 |
| 5,762,309 | A | * | 6/1998 | Zhou | B60N 2/919 248/429 |
| 6,406,092 | B1 | * | 6/2002 | Cordes | B60N 2/1615 297/216.15 |
| 6,669,284 | B2 | * | 12/2003 | Feichtinger | B60N 2/0705 248/429 |
| 7,731,281 | B2 | * | 6/2010 | Kurita | B60N 2/06 297/216.19 |
| 2001/0011810 | A1 | * | 8/2001 | Saiguchi | B60N 2/885 280/728.1 |
| 2003/0001415 | A1 | * | 1/2003 | Haland | B60N 2/4228 297/216.14 |
| 2008/0163708 | A1 | * | 7/2008 | Porinsky | F16H 25/2021 74/89.14 |
| 2008/0238126 | A1 | * | 10/2008 | Koga | B60N 2/067 296/65.13 |
| 2009/0195042 | A1 | * | 8/2009 | Hake | B60N 2/0705 297/344.11 |
| 2010/0013285 | A1 | * | 1/2010 | Stanz | B60N 2/0232 297/344.13 |
| 2011/0133529 | A1 | * | 6/2011 | Guerrero | B60N 2/4221 297/216.18 |
| 2015/0090856 | A1 | * | 4/2015 | Morishita | B60N 2/0705 248/429 |
| 2016/0039313 | A1 | * | 2/2016 | Kuroda | B60N 2/067 248/429 |
| 2016/0059739 | A1 | * | 3/2016 | Tsuji | B60N 2/0727 248/429 |
| 2016/0096459 | A1 | * | 4/2016 | Line | B60N 2/933 297/330 |
| 2016/0114703 | A1 | | 4/2016 | Fujita et al. | |
| 2017/0015221 | A1 | | 1/2017 | Spangler et al. | |
| 2018/0029504 | A1 | * | 2/2018 | Nagata | B60N 2/0705 |
| 2019/0210488 | A1 | * | 7/2019 | Fujita | F16H 1/16 |
| 2019/0351794 | A1 | * | 11/2019 | Huf | B60N 2/42709 |

FOREIGN PATENT DOCUMENTS

| | | |
|---|---|---|
| CN | 203237279 U | 10/2013 |
| CN | 204184435 U | 3/2015 |
| CN | 105358368 A | 2/2016 |
| CN | 106347176 A | 1/2017 |
| DE | 196 48 974 A1 | 5/1997 |
| DE | 100 33 340 C1 | 10/2001 |
| DE | 102 49 237 A1 | 5/2004 |
| DE | 698 27 506 T2 | 11/2005 |

OTHER PUBLICATIONS

German-language Written Opinion (PCT/ISA/237) issued in PCT Application No. PCT/EP2018/054527 dated May 29, 2018 (five (5) pages).
German-language Search Report issued in counterpart German Application No. 10 2017 203 177.8 dated Dec. 11, 2017 with partial English translation (12 pages).
English translation of Chinese-language Office Action issued in Chinese Application No. 201880011782.5 dated Apr. 6, 2021 (10 pages).

* cited by examiner

VEHICLE SEAT CONSOLE

CROSS REFERENCE TO RELATED APPLICATIONS

This application is a continuation of PCT International Application No. PCT/EP2018/054527, filed Feb. 23, 2018, which claims priority under 35 U.S.C. § 119 from German Patent Application No. 10 2017 203 177.8, filed Feb. 27, 2017, the entire disclosures of which are herein expressly incorporated by reference.

BACKGROUND AND SUMMARY OF THE INVENTION

The invention relates to a vehicle seat console. Furthermore, the invention relates to a vehicle seat and to a vehicle equipped with a vehicle seat.

In the event of a collision, for example in the event of a rear-end collision, in conventional motor vehicles, a large portion of the energy transmitted by the mass inertia of a passenger to the seat is dissipated via plastic deformation of the backrest and seat side parts. This is associated with a rearward displacement of the backrest. The rearward displacement of the seat backrest has to be limited to an extent such that the seat still provides sufficient support and the passenger does not slip out of the seat. In the event of very high applications of energy, for example in a head-on crash with rearward sitting, i.e. when the passenger sits with the back to the direction of travel, this design reaches its limit. The limited deformation of the seat means that the latter cannot absorb the acceleration energy introduced by the collision to the extent which would be required in order to keep the acceleration values low. New deformation paths in the longitudinal direction of the vehicle are required in order also to limit occupant acceleration values for such a seat arrangement, i.e. in particular in the event of a rear impact in a classic seat arrangement, in the event of a head-on collision when a passenger sits on a vehicle seat oriented counter to the direction of travel, or when the passenger is in a forwardly directed lying position and is not supported by a belt but rather by the seat cushion.

DE 100 33 340 C1 discloses a seat fastening device for a vehicle, which has at least one rail in which a vehicle seat is arranged movably in the vehicle and which has at least one foot element which connects the rail to a floor of the vehicle. Each foot element is designed as a deformation element absorbing energy in the event of a collision.

DE 102 49 237 A1 discloses a seat arrangement of a vehicle comprising a deformation element for a rear impact. The vehicle seat is mounted in a longitudinally displaceable manner in a bearing rail, wherein the bearing rail is fastened to the vehicle substructure in such a manner that it is connected at the front to the vehicle substructure in a longitudinally displaceable manner and is mounted at the rear in the vehicle substructure in a longitudinally and upwardly displaceable manner. Furthermore, a deformation element is provided which acts in an energy-absorbing manner in the event of a rear impact and during a displacement of the bearing rail relative to the vehicle substructure. Said deformation element is arranged in the region of the rear end of the bearing rail between the latter and the vehicle sub structure.

DE 698 27 506 T2 shows and describes a vehicle seat which has a seat backrest inclination adjustment means which is provided with damping devices in the region of the coupling of the seat backrest to the seat, wherein, in the event of a rear impact, the seat backrest in a damped manner carries out a pivoting movement which is directed counter to the direction of travel and is damped in two stages. The rear impact impulse is damped here by a damped rearward pivoting of the seat backrest, which is possible only in a small angular range in order to prevent the person sitting on the seat from slipping rearward on an excessively inclined backrest.

It is the object of the present invention to provide a vehicle seat console of the type in question which, with optimum support of a person sitting on the vehicle seat by way of the seat backrest, brings about a greatest possible damping of the impulse force which acts on the person sitting on the vehicle seat and is transmitted to the vehicle by a collision. Furthermore, the intention is to provide a vehicle seat comprising a seat console of this type, and a vehicle comprising at least one such vehicle seat.

For this purpose, in the case of a vehicle seat console which is provided with at least one vehicle-side guide element and at least one seat-side guide element arranged parallel to the vehicle-side guide element, and with a longitudinal adjustment device which is acted upon by a drive device by way of a transmission device and is configured to bring about a relative adjustment between the vehicle-side guide element and the seat-side guide element, it is provided that the longitudinal adjustment device and/or the transmission device is provided with at least one energy absorption device which is designed to damp impulse-like relative movements between the vehicle-side guide element and the seat-side guide element.

The energy absorption device ensures that impulse-like forces which are introduced into the vehicle seat console via the vehicle-side guide element, which is formed, for example, by a lower rail of a seat fastening device, said lower rail being fixedly connected to the vehicle structure, are damped and therefore weakened before they act on the seat-side guide element which is formed, for example, by an upper rail of the seat fastening device, said upper rail being connected or connectable to a vehicle seat. Impulse-like forces of this type occur, for example, in the event of a vehicle collision.

In an advantageous embodiment of the vehicle seat console according to the invention, the longitudinal adjustment device has a non-self-locking translatory movement unit or forms such a movement unit, which couples the vehicle-side guide element and the seat-side guide element to each other. Such a refinement of the longitudinal adjustment device permits the impulse force introduced into the longitudinal adjustment device via the vehicle-side guide element to be transmitted as far as the energy absorption device. The force flux between the vehicle-side guide element and the energy absorption device is therefore not blocked by self-locking elements, and therefore the impulse force is conducted as far as the energy absorption device without being able to trigger any blockade of components which are movable relative to one another of the longitudinal adjustment device and optionally of the transmission device.

It is of particular advantage here if the respective translatory movement unit has a rack running parallel to the longitudinal extent of the guide elements and a pinion meshing with the rack, wherein the pinion is mechanically coupled to the drive device. Such a rack drive has the advantage over conventional worm shaft drives that it does not deploy any self-locking effect under the action of impulse forces.

It is also advantageous if the energy absorption device is arranged between the drive device and the non-self-locking translatory movement unit. The energy absorption device is thus provided in the force flux as close as possible to the location at which the impulse force is introduced.

In particular, it is expedient here if the energy absorption device has at least one rotational force-limiting element, for example a torsion bar. Such a rotational force-limiting element can transmit rotation forces, which are applied substantially uniformly by the drive device in order to bring about a longitudinal adjustment between the two guide elements, without relatively great damping or deceleration whereas it cushions and therefore damps force peaks occurring in an impulse-like manner. The rotational force-limiting element, embodied for example as a torsion bar, can advantageously also be configured in multiple stages in order, for example, to obtain a progressive or degressive spring effect and thereby to configure the energy-absorbing effect to be variable over the time profile or in order to be able to react to applications of energy differing in strength. Provision may also be made to control the direction of force limiting in order thereby to adapt the energy absorption device to whether a seat is oriented in the direction of travel or is rotated rearwards counter to the direction of travel. This means that the force-travel characteristic of the rotational force-limiting element or of a rotational force-limiting element arrangement differs in the two opposite directions of rotation. The energy absorption capability of the energy absorption device, for example the plastic deformation of the torsion bar, can also be configured to be adjustable, and therefore a greater or smaller or even no energy absorption effect can be provided depending on the occupation of the vehicle seat.

The energy absorption device preferably has travel-limiting measures for the torsion bar. Said travel-limiting measures serve not only for protecting the energy absorption device from destruction, but also make it possible to transmit the damped impulse force in a controlled manner.

An embodiment of the vehicle seat console according to the invention in which a self-locking movement unit is arranged between the drive device and the energy absorption device, is also advantageous. The self-locking movement unit which, during normal operation, brings about a desired fixing of the movable components of a seat adjustment device when the latter is not actuated is thus not contained in the force flux between the impulse force introduced into the longitudinal adjustment device during a collision and the energy absorption device and does not disturb the force flux there, but rather, during normal operation, can exert the desired self-locking effect on the longitudinal adjustment device.

It is advantageous here if the self-locking movement unit is formed by a worm shaft mechanism or has such a mechanism.

In addition, the invention is directed toward a vehicle seat comprising a vehicle seat console according to the invention and toward a vehicle, in particular a motor vehicle, equipped with such a vehicle seat, wherein the invention is not limited to cars, but is also usable in other land vehicles and in aircraft and in watercraft.

The basic concept according to the invention of providing an energy absorption device in the force flux of a seat longitudinal adjustment device between a vehicle chassis or a vehicle structure and a longitudinally adjustable vehicle seat attached thereto is not limited to the mechanical longitudinal adjustment device described here. It can likewise be realized if the longitudinal adjustment device is realized, for example, electromagnetically by means of a linear motor, with the energy absorption device then being able to be formed by an eddy current brake.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
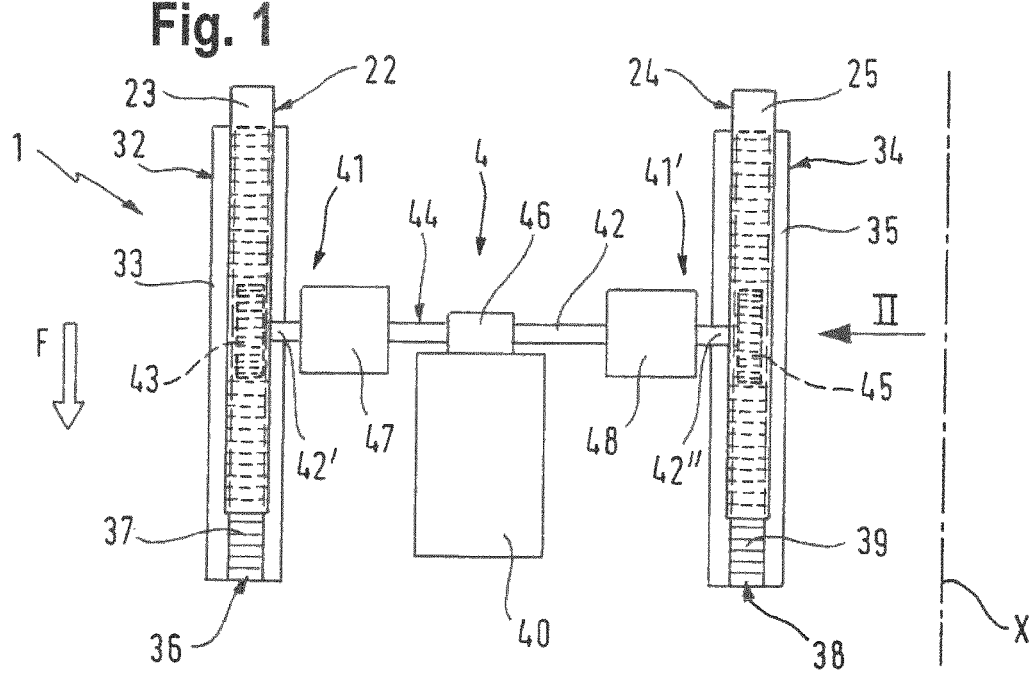
FIG. 1 shows a basic layout scheme of a seat console according to an embodiment of the invention.

FIG. 1 shows a schematic basic layout of a vehicle seat console according to an embodiment of the present invention. The vehicle seat console 1 connects a vehicle seat 2 to the chassis 30 of a vehicle 3, as illustrated schematically in FIG. 3. For this purpose, the vehicle seat console has guide elements 32, 34 oriented in the longitudinal direction of the vehicle, namely in each case a right lower guide rail 33 connected fixedly to the vehicle floor 31 and a left lower guide rail 35 likewise connected fixedly to the vehicle floor 31. The lower guide rails 33, 35 are parallel to the longitudinal direction X of the vehicle. Upper guide rails 23, 25 attached to the vehicle seat 2 are in sliding engagement in a conventional manner with said lower guide rails 33, 35. The upper guide rails 23, 25 form seat-side guide elements 22, 24. A respective sliding surface, which is not shown and described in more detail in the figures and is advantageously provided or coated with a sliding mechanism is formed between the lower guide rails 33, 35 and the upper guide rails 23, 25. A rolling bearing, for example a ball bearing, can also be provided instead of a sliding surface.

A respective rack 36, 38 which is mounted on the vehicle and extends substantially over the length of the respective lower guide rails 33, 35 is attached within or next to the right lower guide rail 33 and the left lower guide rail 35. In the example shown, the toothing 37, 39 of the respective rack 36, 38 is directed upward such that the teeth point toward the vehicle seat 2.

Figure 2:
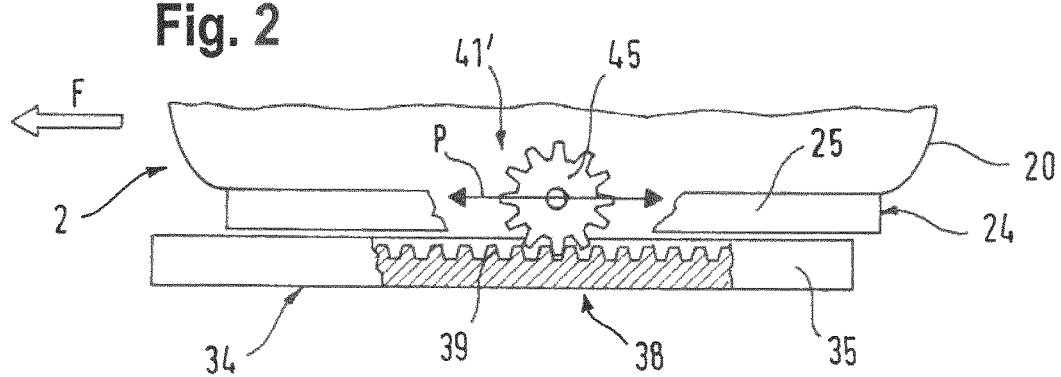
FIG. 2 shows a detail of a side view of the seat console in the direction of the arrow II in FIG. 1.

A seat adjustment mechanism 4 is arranged on the lower side of the seat base 20 of the vehicle seat 2. The seat adjustment mechanism 4 has a drive device 40, for example an electric motor, which is coupled to a drive shaft 42 extending in the transverse direction (y) of the vehicle and acts upon same with a drive force. At the respective left and right end of the drive shaft 42, a gearwheel (pinion) 43, 45 is in each case connected to the drive shaft 42 for rotation therewith, wherein the respective gearwheel 43, 45 is arranged in such a manner that it lies above the respective rack 36, 38 of the respectively assigned vehicle-side guide element 32, 34 and meshes with the respective toothing 37, 39. Rotation of the drive shaft 42 brought about by the drive device 40 causes rotation of the gearwheel 43, 45 which is attached to the respective end of the drive shaft 42 and which then migrates forward in the direction of travel F or rearward owing to the meshing with the respectively assigned rack 36, 38 and carries along the vehicle seat 2 in said direction, as symbolized by the double arrow P in FIG. 2. The lower guide rails 33, 35, the upper guide rails 23, 25, the racks 36, 38 and the gearwheels 43, 45 thereby each form a longitudinal adjustment device 41, 41' for the vehicle seat 2. Each respective longitudinal adjustment device 41, 41' forms a non-self-locking translatory movement here.

The drive shaft 42 forms a transmission device 44 for the torque, which is applied by the drive device 40, toward the respective longitudinal adjustment device 41, 41'.

So that the vehicle seat 2 cannot be unintentionally displaced in the normal situation by application of moderate external forces, a self-locking movement unit 46 which has, for example, a worm shaft drive is provided between the drive device 40 and the drive shaft 42.

A respective energy absorption device 47, 48 which, in the example shown, is integrated in the drive shaft 42, is provided between this self-locking movement unit 46 and the right gearwheel 43 and the left gearwheel 45, respectively, of the longitudinal adjustment device 41. For example, the drive shaft 42 is designed in this region as a torsion bar.

In the event of a more severe collision of the vehicle 3 with an obstacle or another vehicle, in which the collision force has a substantial component in the longitudinal direction x of the vehicle, the vehicle 3 is accelerated positively (rear impact) or negatively (head-on impact) by the collision force which occurs in an impulse-like manner. During said acceleration, the vehicle seat 2 with the person sitting thereon initially maintains the original speed owing to the inertia mass of said person and of the vehicle seat 2 in the case of the vehicle seat according to the invention while the vehicle 3 is already subject to the change in speed triggered by the acceleration exerted due to the collision. This leads to a relative movement of the vehicle-side guide elements 32, 34 connected fixedly to the vehicle chassis 30 and of the seat-side guide elements 22, 24 connected fixedly to the vehicle seat 2. In the process, the respective gearwheel 43, 45 rolls on the associated rack 36, 38 and brings about a rotational movement in the respective outer section 42', 42" of the drive shaft 42. Said rotational movement leads to torsion in the respective energy absorption device 47, 48, for example in the torsion bar provided there. The torque applied in an impulse-like manner by the respective outer section 42', 42" of the drive shaft is thereby cushioned and damped. The respective gearwheel 43, 45—driven by the rack 37, 39 moving relative to the gearwheel axis due to the collision—can thus slightly rotate without the gearwheel axis, i.e. the drive shaft 42, also moving immediately and with the same impulse-like acceleration in the direction of the double arrow P shown in FIG. 2. By means of the damping, exerted by the respective energy absorption device 47, 48, of said impulse-like shock, the movement of the gearwheel axis in the direction of the double arrow P takes place with a time delay and with a lower acceleration because of being damped. The acceleration impulse due to the collision is therefore transmitted to the vehicle seat and thus to the person sitting on the vehicle seat with a delay and in damped form.

Figure 3:
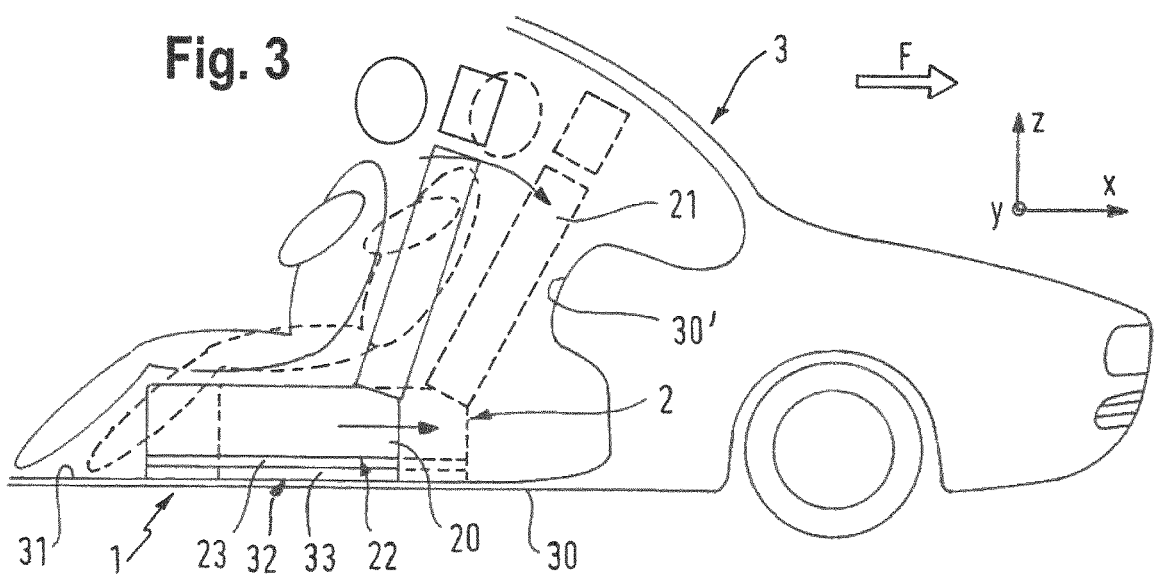
FIG. 3 is a schematic illustration of a front passenger seat which is equipped with the vehicle seat console according to the embodiment of the invention and is oriented counter to the direction of travel.

FIG. 3 shows a schematic illustration of a passenger's seat with the direction of view counter to the direction of travel F, that is to say the vehicle seat 2 faces with a seat backrest 21 toward the dashboard 30' of the vehicle 3. The illustration of the vehicle seat 2 and of the person sitting thereon indicates the normal seat position with solid lines, and the illustration with dashed lines illustrates the displacement of the vehicle seat 2 that occurs during a head-on collision, with the person sitting thereon forward in the direction of travel F. This is made possible in the case of the vehicle seat 2 according to the invention by the vehicle seat console according to the invention. It can be seen here that the change in inclination of the vehicle seat backrest 21 occurs only to a low extent. In the case of a conventional vehicle seat, in which the seat base 20 is rigidly connected to the vehicle seat in the event of a collision, the forces which are due to the mass inertia and are exerted by the person would have to be absorbed by the vehicle seat backrest 21 by itself, which would lead to a greater inclination of the backrest in the direction toward the dashboard 30' and as far as the vehicle seat backrest 21 colliding with the dashboard 30'.

Although the invention has been described here with reference to the right front vehicle seat which, in the case of vehicles with left-hand drive, corresponds to the passenger seat, it can also be realized in any other vehicle seat in the front seat row, in the rear seat row or in a central seat row. The use of the described invention is also independent of whether the vehicle seat faces in the direction of travel or counter to the direction of travel.

The invention is not limited to the above exemplary embodiment which merely serves for the general explanation of the core concept of the invention. On the contrary, within the scope of protection, the apparatus according to the invention can also adopt other embodiments than those described above. The apparatus here can in particular have features which constitute a combination of the respective individual features of the claims.

Reference signs in the claims, the description and the drawings serve merely for better understanding of the invention and are not intended to restrict the scope of protection.

LIST OF REFERENCE SIGNS

1 vehicle seat console
2 vehicle seat
3 vehicle
22 seat-side guide element
23 upper guide rail
24 seat-side guide element
25 upper guide rail
30 chassis
30' dashboard
31 vehicle floor
31' dashboard
32 vehicle-side guide element
33 lower guide rail
34 vehicle-side guide element
35 lower guide rail
36 rack
37 toothing
38 rack
39 toothing
40 drive device
41 longitudinal adjustment device
41' longitudinal adjustment device
42 drive shaft
42' outer section
42" outer section
43 gearwheel (pinion)
44 transmission device
45 gearwheel (pinion)
46 self-locking movement unit
47 energy absorption device
48 energy absorption device
p double arrow The foregoing disclosure has been set forth merely to illustrate the invention and is not intended to be limiting.

Since modifications of the disclosed embodiments incorporating the spirit and substance of the invention may occur to persons skilled in the art, the invention should be construed to include everything within the scope of the appended claims and equivalents thereof.

What is claimed is:

1. A vehicle seat console, comprising:
a vehicle-side guide;
a seat-side guide arranged parallel to the vehicle-side guide;
a longitudinal adjustment device which is acted upon by a drive by way of a transmission and is configured to bring about a relative adjustment between the vehicle-side guide and the seat-side guide, wherein
the longitudinal adjustment device and/or the transmission is provided with at least one energy absorption device which is configured to damp impulse forces that cause relative movements between the vehicle-side guide and the seat-side guide, wherein
the energy absorption device has at least one torsion bar.

2. The vehicle seat console according to claim 1, wherein the energy absorption device has travel-limiting measures for the torsion bar.

3. A vehicle seat console, comprising:
a vehicle-side guide;
a seat-side guide arranged parallel to the vehicle-side guide;
a longitudinal adjustment device which is acted upon by a drive by way of a transmission and is configured to bring about a relative adjustment between the vehicle-side guide and the seat-side guide, wherein
the longitudinal adjustment device and/or the transmission is provided with at least one energy absorption device which is configured to damp impulse forces that cause relative movements between the vehicle-side guide and the seat-side guide, wherein
the longitudinal adjustment device comprises a non-self-locking translatory movement unit, which couples the vehicle-side guide and the seat-side guide to each other, and
the energy absorption device is arranged in a force flux of the impulse forces between the drive and the non-self-locking translatory movement unit.

4. The vehicle seat console according to claim 3, wherein the non-self-locking translatory movement unit has a rack running parallel to a longitudinal extent of the guide and a pinion meshing with the rack, wherein the pinion is mechanically coupled to the drive.

5. The vehicle seat console according to claim 3, wherein a self-locking movement unit is arranged between the drive and the energy absorption device.

6. The vehicle seat console according to claim 5, wherein the self-locking movement unit comprises a worm shaft mechanism.

7. A vehicle seat comprising:
the vehicle seat console according to claim 3; and
a seat mounted on the vehicle seat console.

8. A vehicle, comprising:
the vehicle seat according to claim 7; and
a floor on which the vehicle seat is mounted.

9. The vehicle according to claim 8, wherein the vehicle is a motor vehicle.

* * * * *